United States Patent
Duncan et al.

[11] Patent Number: 5,916,308
[45] Date of Patent: Jun. 29, 1999

[54] DYNAMIC LINK LIBRARIES WITHOUT LINKER OR LOADER SUPPORT

[75] Inventors: Robert Paul Duncan, Scarborough; Mike Stephen Fulton, Don Mills; Brian James Minchau, North York, all of Canada

[73] Assignee: International Business Machines Corporation, Armonk, N.Y.

[21] Appl. No.: 08/606,788

[22] Filed: Feb. 27, 1996

[30] Foreign Application Priority Data

Feb. 27, 1995 [CA] Canada ................................. 2143488

[51] Int. Cl.⁶ .......................................... G06F 9/40
[52] U.S. Cl. ............................................ 709/305
[58] Field of Search ................................. 395/710, 685

[56] References Cited

U.S. PATENT DOCUMENTS

| | | | |
|---|---|---|---|
| 5,175,828 | 12/1992 | Hall et al. | 395/375 |
| 5,247,678 | 9/1993 | Littleton | 395/685 |
| 5,297,291 | 3/1994 | Murphy | 395/685 |
| 5,339,430 | 8/1994 | Lundin et al. | 395/685 |
| 5,408,665 | 4/1995 | Fitzgerald | 395/710 |
| 5,561,800 | 10/1996 | Sabatella | 395/685 |
| 5,774,722 | 7/1998 | Gheith | 395/685 |

FOREIGN PATENT DOCUMENTS

WO9501598  1/1995  WIPO .............................. G06F 9/44

OTHER PUBLICATIONS

Ducan, Ray, "Export tables in Windows NT executable files," PC Magazine, v12, n6, p. 329(5), Mar. 1993.

Thorpe, Danny, "Cross–platform DLLs for DOS and Windows," PC Magazine, v13, n4, p. 275(6), Feb. 1994.

Peter Calingaert; Assemblers, Compilers, and Program Translation; Computer Science Press, pp. 242–254, Jun. 1984.

IBM C/370, Programming Guide, Mar., 1991, p. 77.

IBM MVS/Extended Architecture Linkage Editor and Loader User's Guide, Version 2, Release 4, Sep., 1989, p. 126.

*Primary Examiner*—Alvin E. Oberley
*Assistant Examiner*—St. John Courtenay, III
*Attorney, Agent, or Firm*—Kevin M. Jordan

[57] ABSTRACT

In present computing systems having dynamic linked libraries (DLLs), the user must either explicitly provide directives at the source level or use linker and loader support provided by the computing system. The present invention enables an application programmer to use unmodified source code in conjunction with a compiler, prelinker and runtime library to develop and use DLLs. A DLL can be extended by adding new functions and variables without requiring users of the DLL to recompile or relink their application.

10 Claims, 3 Drawing Sheets

DYNAMIC LINK LIBRARIES WITHOUT LINKER OR LOADER SUPPORT

FIELD OF THE INVENTION

The present invention is related to computer compilers and link libraries and according to a particular embodiment, is related to enabling symbols in dynamic link libraries to be linked without requiring support from a system linker or loader. Another embodiment of the present invention is related to enabling reentrant application programs to have dynamic linking with dynamic link libraries.

BACKGROUND OF THE INVENTION

When writing computer programs, a programmer writes a source code file in a high level human readable language. "C" and "C++" are two of these languages that are often used. In these languages the programmer typically writes code to perform a particular application or function. This source code file is then provided to a compiler which takes the source code as input and generates a binary non-human readable object deck. Many of these binary object decks are combined to complete a machine executable program. To build this complete executable program or load module, a linker binds together separate object decks into a single functional program. Each object deck defines and references symbols by name. The linker also resolves the corresponding definitions and references to the definitions which may be in different object decks.

The compiler generates object decks which reference symbols which are in a modifiable data area and in a format which is not supported by the system linker/loader. These references to symbols may be linked later with a definition or may be left partially linked. If only partially linked, the linking would be resolved at runtime.

With current compilers it is necessary to resolve the symbol definitions when the object decks are being linked by the linker. See, for example, the compilers used on the S/370 Data Processing System (DPS) available from International Business Machines Corporation. With this system copies of the object decks must be statically linked in to each application that uses them.

Having to statically link each object deck to each application that uses it creates a number of problems. For example, the size of the object code file becomes very large since it is necessary to have many copies of object decks. Each of the various programs that needs one of the definitions at link-time must have a copy of the object deck available to it and the only way it can do that, where it must be statically linked to the application, is by making a copy of the object deck. Obviously, it would be preferable to have a single copy of each object deck which is made available to each application without the need for each application to retain its own copy.

It is also very difficult to maintain the code in the decks when there are multiple copies to locate and fix. A fix to a single piece of code would require statically relinking all the programs that use that code. If the compilation unit were maintained in only one place then making a fix would be relatively easy.

A Dynamic link library (DLL) is a collection of one or more functions or variables which are gathered into a load module. The so-gathered load module contains executable code accessible from a separate application load module or another DLL. The connection (link) from the application to the functions or varibles in the DLL is not made statically at application build-time but dynamically during execution of the application.

Dynamic link libraries (DLLs) are used to delay the linking of referenced symbols until application runtime. The term symbol is used herein to define either or both of functions and variables held in a DLL. This enables all applications to use the same DLL's. This solves the problem of storing and maintaining multiple copies of each object deck containing definitions of referenced symbols. The use of DLL's also allows a function call or a variable reference in one load module to access a definition in another load module.

The implementation of most DLLs requires address modification of symbols in the load module at runtime. This makes the program non-reentrant so that all users cannot share the same code area of a DLL. An embodiment of the invention provides a method of ensuring that the modification to the DLL does not require a modification in the load module. This makes the program, reentrant.

U.S. Pat. no. 5,175,828 to Michael L. Hall describes a dynamic linker which preserves the program's data and state but changing instructions in the programs functions (code area).

U.S. Pat. no. 5,247,678 to James G. Littleton describes a dynamic linker which does the address fix ups in the code-area. As a result, the applications are non-reentrant.

U.S. Pat. no. 5,297,291 to Daniel L. Murphy describes an ordered list of exported symbols which remains in that fixed order provided by the programmer to construct a symbol vector and that the linker and operating system use this vector.

U.S. Pat. no. 5,339,430 to Kennith Lundin describes the dynamic linking required to install new versions of software modules (libraries) while they are in use by an application.

SUMMARY OF THE INVENTION

An embodiment of the present invention advantageously provides a method, using a compiler, prelinker and runtime library, for partially linking a program to dynamically load another program at application runtime and resolve addresses in the partially linked program without requiring support from the system linker or loader. This may be achieved without any changes in the source code of the application program.

A further advantage is provided by a method of indirection (function descriptors) where the information about a function includes not only the address of the executable code but, also, information on the context or environment of the function. The context or environment information points to a data area corresponding to the functions code area and identifies which load module needs to be loaded to resolve the function at runtime.

An additional advantage is provided by a method of indirection (variable descriptors) where the information about a variable includes information on its context or environment. The context and environment information indicates which load module needs to be loaded to resolve the variable at runtime.

A still further advantage is that address resolution is enabled in the data area allocated by a runtime library. The code area of the program is not used for address resolution so, once the code area is loaded into computer memory, the code area may be concurrently shared by multiple invocations. This makes the program reentrant.

Yet another advantage of the present invention is that a DLL need not be loaded by the program referencing an imported function from it. A function pointer (address of a function descriptor) may be passed to another program which does the first call and triggers the DLL load.

A further advantage of the present invention is to enable the address of a function descriptor to be used in place of the address of a function for purposes of execution.

The present invention further advantageously provides the ability for a DLL to import symbols from other DLLs. The present invention further permits DLL enabled object code (function descriptor based) to be used with non-DLL object code (function address based) with minimal restrictions. A function descriptor can be passed to non-DLL code for function execution purposes but not for function pointer comparison. A function address in non-DLL code can not be passed to DLL code for either execution or function pointer comparison.

The invention further advantageously enable symbol references in DLL object code to be resolved by either imported or non-imported symbols without knowing, at compile time which type of symbol will be used.

The invention further advantageously provides that code with explicit RTL function calls for DLL services may be mixed with code having implicit DLL object code.

According to a preferred embodiment of the present invention, a prelinker takes object decks generated by the compiler as input and generates a prelinked object deck as an output. The prelinked object deck includes information about a modifiable data area in its code area. The code area is in a standard format that is acceptable to the system linker/loader. The code area may be write protected to ensure that the address information in the code area cannot be changed. The prelinker gathers information concerning the data area together in the code area so that a runtime library can locate the data when needed. The information gathered by the prelinker enables the runtime library to determine the size of the modifiable data area needed, how to initialize it, and where to fix up addresses in the data area should the referenced symbols be dynamically linked.

With the present invention, the system linker/loader only needs to fix up the addresses of symbols in the code area which are not dynamically linked. Once the loader has loaded the application's code area, the code area may be write protected so the addresses are not modified at runtime.

The runtime library (RTL) fixes up the addresses of dynamically linked symbols at runtime in the application's modifiable data area.

The invention enables symbols to be dynamically linked without requiring any changes in the users source code. Of course, the application writer may still choose to use explicit RTL services to obtain the addresses of the referenced symbols if he wishes to do so.

An embodiment according to the present provides an improved method for linking dynamically linked libraries to programs executing on a data processing operating system having a compiler, a prelinker, a runtime library, a system linker and a system loader. The method comprises the steps of: the compiler compiling an application program code with the DLL to create a DLL object deck and an application object deck which includes code for calling a trigger routine and encoding the DLL object deck with information identifying an exported symbol referenced in the application program code; the prelinker prelinking the DLL object deck to create a prelinked DLL object deck, responsive to the encoding step; the prelinker prelinking the application object deck with the information identifying the exported symbol, the prelinker creating a prelinked application object deck which includes an export definition section; the system linker linking the prelinked application object deck to create an application load module and linking the DLL prelinked object deck to create a DLL load module; and running the application load module and resolving references to unresolved symbols in the application load module without requiring assistance from the system linker or the system loader.

According to another embodiment of the present invention, the aforementioned step of resolving references to unresolved symbols in the application load module without requiring assistance from the system linker or the system loader comprises the steps of: the trigger routine accessing the export definition section; the runtime library accessing the DLL containing the unresolved symbols, responsive to the step of the trigger routine accessing the export definition section; and loading the DLL and resolving the unresolved symbols in the application load module responsive to the runtime library accessing step.

According to another embodiment of the present invention, the aforementioned step of prelinking the application object deck further comprises the step of reading the information identifying the exported symbol and generating a definition file for the DLL, the definition file including the information identifying the exported symbol reference.

According to another embodiment of the present invention, the definition file further specifies whether the exported symbol is code or data and the dynamic link library defining the symbol. According to still another embodiment of the present invention, the aforementioned step of prelinking the application object deck further comprises the step of reading the information identifying the exported symbol directly from the DLL.

According to yet another embodiment of the present invention, exported symbols comprise external variables and external functions. According to another embodiment of the present invention, the trigger routine is one of a trigger load on reference for variables and a trigger load on call for functions.

According to another embodiment of the present invention, the aforementioned step of resolving references to unresolved symbols further comprises, the run time library modifying an address of the unresolved symbols in a data area of the DLL during runtime so that the program is reentrant.

BRIEF DESCRIPTION OF THE DRAWINGS

The novel features believed characteristic of the invention are set forth in the appended claims. The invention itself, however, as well as other features and advantages thereof, will be best understood by reference to the detailed description, when read in conjunction with the accompanying drawings, wherein;

DETAILED DESCRIPTION

Figure 1:
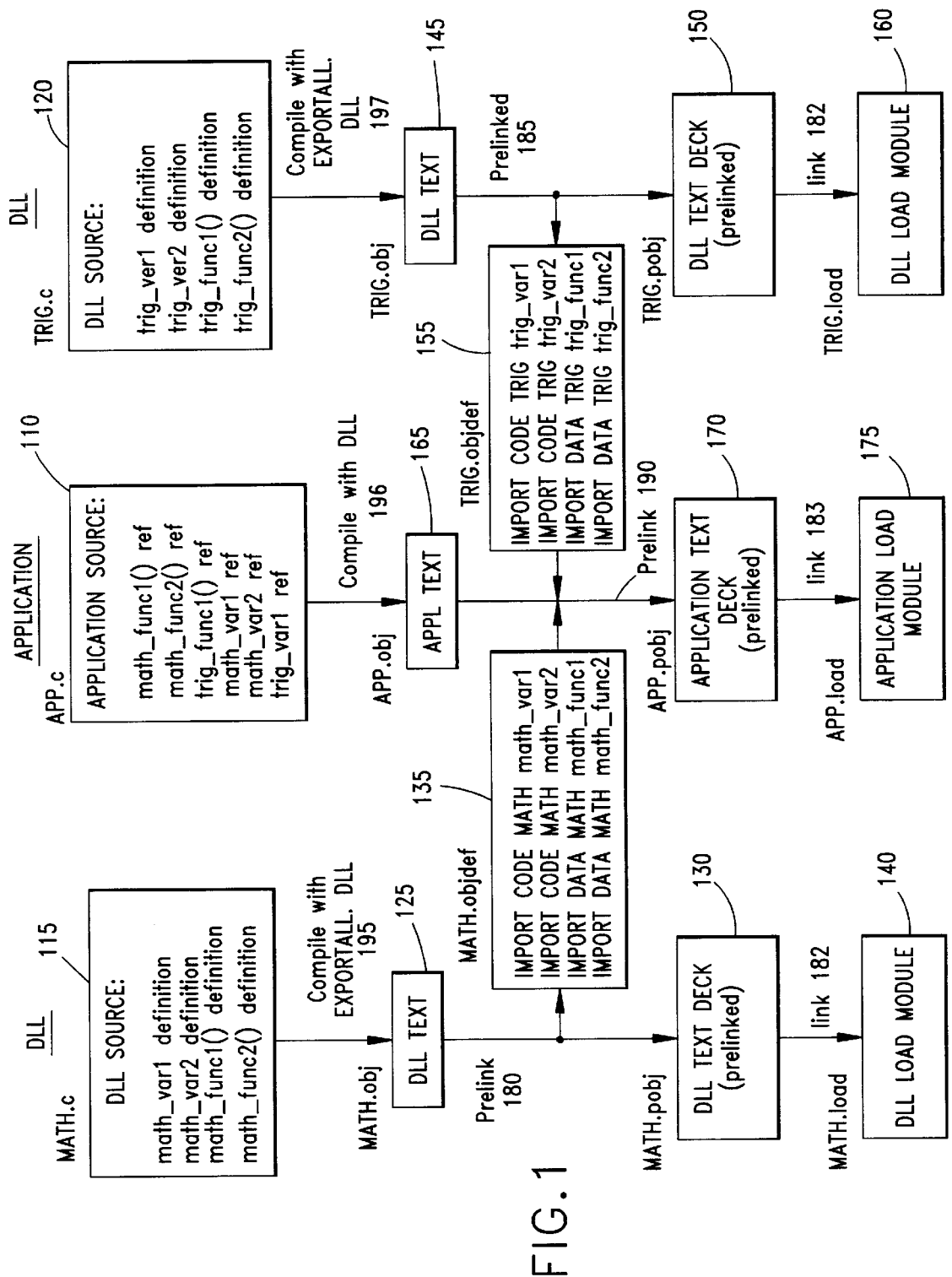
FIG. 1 illustrates an embodiment of a method in which two DLL modules and a related application module are built in accordance with the teachings of the invention.

As an aid to understanding the detailed description, the following definitions and overview are provided: A compiler generates object code that refers to symbols in a modifiable data area (typically data items) and symbols (typically executable code) in a code area.

An embodiment of the present invention may be implemented on a data processing system (DPS) sold under the trademark 'S/370' by the International Business Machines Corporation. An object module on the S/370 DPS contains Name records which associate a name with an id number for an item, initialization records which provide initialization information of part of an item with constant values and fixup records which request the placement of an address of one item at a certain location within another item.

Each name record on the S/370 DPS also associates the name with a type. Examples of some types are a definition of an item in the code area, a reference of an item in the code area, a definition of an item in the modifiable data area or a reference of an item in the modifiable data area.

Also, on the S/370 DPS, the initialization information of items defined in the code area may contain object code instructions.

The system linker/loader in the S/370 DPS does not provide support for the initialization of items in a modifiable data area. Non-DLL object code (old type) can only reference named symbols which must be resolved by link-time.

A function or external variable is 'imported' if its definition does not exist in the program where a reference is made. A function or variable is 'exported' if its definition in one load module can be referenced in another load module.

To be able to dynamically link symbols from another load module the application source file must be compiled with the "DLL" option. This option instructs the compiler to generate DLL object code for calling functions and referencing external variables located in the DLL modules that are to be dynamically linked to the application module.

The following code fragment illustrates, in the MVS operating system available from International Business Machines Corporation, how an application could use the DLL. The application is written as if the functions were to be statically bound. For example:

```
math_func1(.....); /* function prototype - no different than any other */
extern int math_var1;/* declaration - no different */ main () {
math_func1(); /* imported function reference */
math_var1=7; /* imported variable reference */
}
```

In S/370 DLL object decks, DLL object code sequences are always generated by the compiler for referencing functions. With this code imported functions can be referenced as well as non-imported functions.

The compiler is unaware if a function is defined in another compilation unit but still within the application, or is truly imported from a DLL and generates the same code for both. The function called is the one indicated inside the function descriptor. For any imported function, the function descriptor initially indicates that a RTL trigger function should be called.

There are three methods of dynamically linking program modules. If the connection is made before any user code is executed it is called an implicit load-time DLL. If the connection is made during user code execution but triggered through RTL services not seen in the source code it is called an implicit load-on-use DLL. If the connection is made during user code execution through explicit RTL services seen in the source code it is called an explicit runtime DLL.

For implicit load-on-use the RTL trigger function loads the DLLs code and data areas. The RTL does this by using the system loader to load the code area and the RTL itself allocates and initializes the corresponding data area based on information which the RTL finds in the loaded code area. Once loaded, the RTL finds the descriptor in the caller's data area and replaces the address of the trigger function in the descriptor with the address of the desired function so that this triggering of the DLL only happens once. After this, the RTL calls the DLL function as if the application had made its initially desired call.

The generated object code for calling a function through a function descriptor for the S/370 DPS could be like:

```
L       Rx,QCON(Rc)        /* Get the offset of the function descriptor. */
A       Rx,DATAADDR(r13)   /* Add base address of current load           */
                           /* module's data area to                      */
                           /* get address of the function descriptor.    */
LM      r15,r0,8(Rx)       /* Load the function's address and            */
                           /* corresponding data area address for that   */
                           /* load module from the words at offsets      */
                           /* 8 and 12 in the function descriptor.       */
BALR    r14,r15            /* Call the function (possibly a RTL          */
                           /* trigger function).                         */
```

In the data area the corresponding function descriptor could contain:

```
on entry
+0    LR r0,r15          *save this descriptors address in r0
+2    L  r15,16(r15)     *load addr of @@GETFN from below
+6    BR r15             *call @@GETFN
+8    Addr(function)     *Address of the function
+12   Addr(Data area)        *Address of corresponding Data area
+16   V(@@GETFN)             *RTL routine
```

The function descriptor contains executable instructions at its start. This is for old non-DLL object code to use the address of a function descriptor in place of the address of a function for purposes of execution. Executing the instructions at the start of a function descriptor calls the RTL service @@GETFN with the address of the descriptor in r0. @@GETFN calls the function who's address is at offset 8 in the descriptor.

The block diagram of FIG. 2, which will be described in detail later, illustrates the indirection of addressing through the use of descriptors 215 in the application APP's data area. The application APP's code 205 contains addresses 225 which refer to descriptors 215 in its own data area 210.

Figure 3:
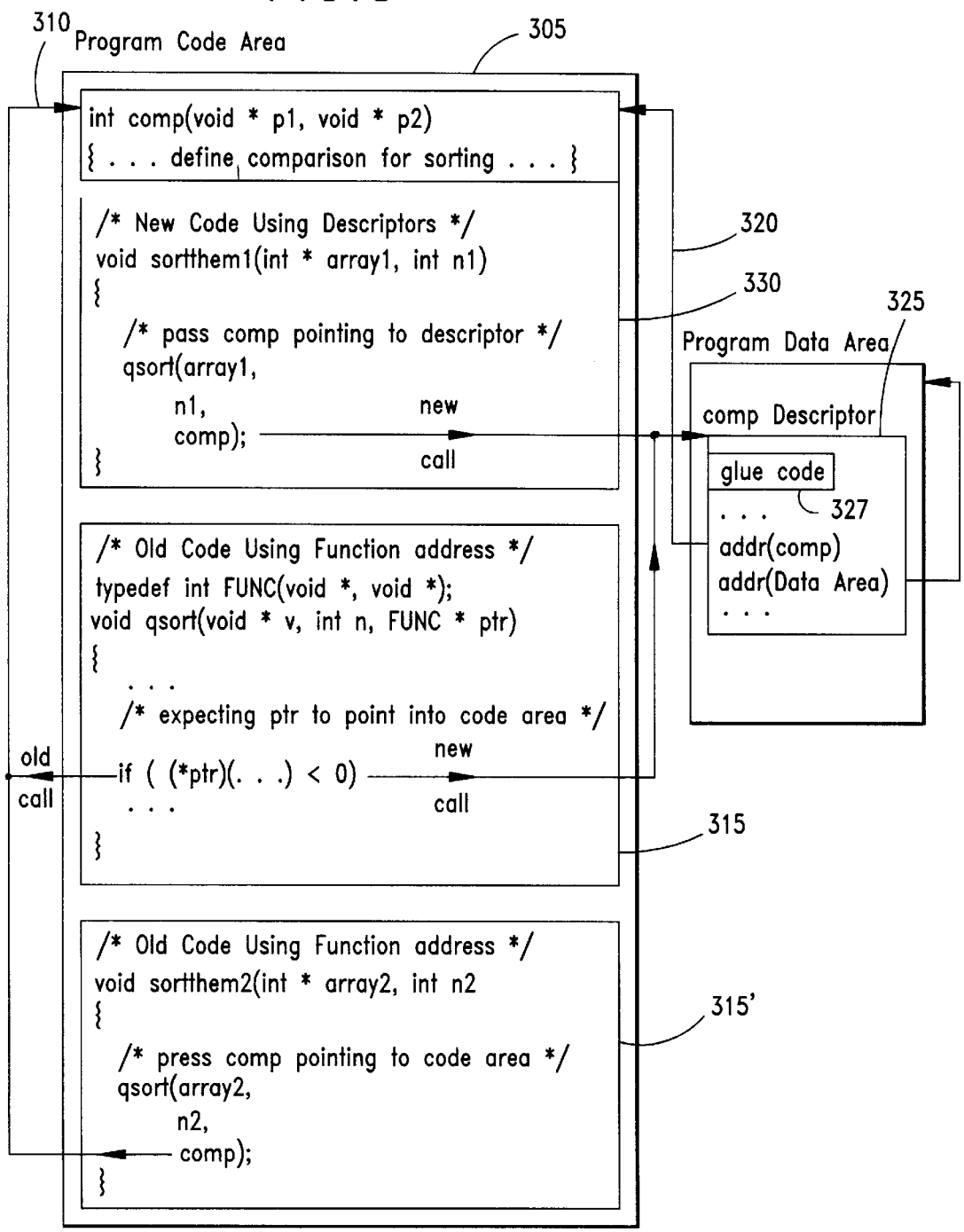
FIG. 3 shows a block diagram and flowchart of a method according to the present invention for re-using previously written code without requiring recompilation of the previously written code.

By way of overview, FIG. 3 illustrate a version of the present invention which is compatible with older non-DLL object code 315. An address of the function in a code area 310 in non-DLL object code 315 may not be passed to DLL object code for either execution or comparison since the DLL code, in accordance with the previous version of the present invention, will treat it as a descriptor. The address 320 of a descriptor 325 may be passed to non-DLL code as a function address for execution purposes only. The version of the invention which is now described includes some 'glue code' 327 at the start of each function descriptor 325 for this execution purpose.

Specifically, FIG. 3 shows non-DLL code in the function 'sortthem2 ' 315' which passes the address of a function named 'comp ' to the non-DLL routine 'qsort ' 315. DLL code in function 'sorthem1' 330 calls the same routine 'qsort' 315 but passes the address of a function descriptor for 'comp'. The non-DLL code in 'qsort' 315 interprets the data in the descriptor as executable code and executes it. The 'glue code' 327 at the start of the function descriptor makes this happen successfully. The glue code is small and fast.

In S/370 DLL object decks, DLL object code sequences are always generated by the compiler for referencing variables not defined in the current compilation unit and which may be imported. With this code, imported variables can be referenced as well as non-imported variables.

The compiler emits a reference which indicates that this variable is possibly imported from a DLL. A reference to an imported variable is resolved through an additional indirection. The application reference to a DLL variable is generated as an indirect reference via an address stored in the application's data area in a variable descriptor. The generated code sequence for the reference also includes the execution of the DLL loader on the first reference to the imported variable.

For instance, given the code fragment:

```
        .
        .
        .
extern char * var1;
        .
        .
        .
var1 = 7;
```

For a possibly imported variable, the compiler generates code with an additional level of indirection as if the following were coded:

```
static char * base__mydata;       /* base addr of my data area       */
static char * off__var1;                  /* offset from base to var1 data    */
static char * addr__var1;                /* address of var1 data            */
static char * off__fixup;                /* offset fixed up by prelinker     */
static char * addr__var1__descriptor;    /* address variable descriptor     */
if (off__fixup > 0) {             /* If high bit of fixup not on      */
off__var1 = off__fixup;           /* use offset to var1 in my data.        */
}
else {                            /* If high bit of fixup is on       */
addr__var1__descriptor =           /* the offset is to a descriptor    */
base__mydata +                    /* in my data area but ignoring     */
(0xEFFFFFFF & off__fixup);   /* the high bit of the offset.      */
off__var1 =                       /* Get a value in the descriptor.       */
*addr__var1__descriptor;
if (off__var1 == 0) {             /* If DDL not yet loaded            */
@@TRGLOR(addr__var1__descriptor);     /* then load it.                */
off__var1 =                       /* Now the value is descriptor          */
*addr__var1__descriptor;          /* must be fixed up, so get it.     */
}
}
/* imported or not, off__var1 is now assigned */
addr__var1 = base__mydata + off__var1;
        .
        .
        .
*addr__var1 = 7;
```

For implicit load-time or implicit load-on-use DLL, the compiler generates code which tests, at runtime, if the fixed up offset is to a variable defined in the application or to a variable descriptor imported from a DLL. For example, the high bit of the fixed up offset could be tested. if the offset is to a variable descriptor the compiler generated code tests if the DLL which has the variable definition is loaded and the variable address is already resolved. This test is done by looking in a variable descriptor (in the application's own data area). If not yet resolved it calls a RTL service with the address of the variable descriptor.

This RTL service loads the DLL which contains the definition of the imported variable. The RTL service then stores the variable's address in a variable descriptor. A variable descriptor minimally contains a location where the RTL will place the address of the variable.

The object code then obtains the address from the variable descriptor and proceeds.

If the fixed up offset of a variable is not imported, the compiler obtains the address of the variable which is within its own data area. All of this is not seen at the source code level.

The generated object code to use a variable descriptor for the S/370 could be like:

```
LOADQCON  ICM    r15,QCON(Rc)            /* load prelinker fixed up offset    */
          BM     DLLREF                  /* fall through if high bit is off   */
ADDBASE   LR     Rx,r15                  /* copy offset to desired register   */
   . . .                                 /* add base address of data area     */
   . . .                                 /* use address                       */
DLLREF    MVC    BSAVE(2,r13),INST_OFF(Rc)  /* save return addr.              */
          B      DLLREFS                 /* copy branch inst. X'477X0XXX'     */
DLLREFS   LA     r15,0(r15)              /* clear high bit of offset          */
          A      r15,DATAADDR(r13)       /* add base address of data area     */
          ST     r15,REGSAVE+4(r13)      /* save descriptor address           */
LOADADDR  ICM    r15,0(r15)              /* get variable addr. from desc.     */
          EX     r0,BSAVE(r13)           /* branch to ADDBASE if non-zero     */
                                         /* i.e. if already resolved          */
                 /* load the DLL to resolve the variable address              */
DLLLOAD   L      r15,V(@@TRGLOR)         /* load addr of DLL load func        */
          ST     r14,REGSAVE(r13)        /* save r14 before DLL load          */
          ST     r0,REGSAVE+8(r13)       /* save r0 before DLL load           */
          L      r0,REGSAVE+4(r13)       /* load descriptor addr              */
          BALR   r14,r15                 /* call DLL load function            */
          DC     =F'PARMSIZE'            /* parm size 8 byte aligned          */
          LM     r14,r0,REGSAVE(r13)     /* restore regs                      */
          B      LOADADDR /* branch to LOADADDR                               */
          /* to reduce instruction bloat the DLLREFS,LOADADDR, DLLLOAD        */
          /* is shared by multiple DLL variable references                    */
          /* but there is one DLLREF section for each variable reference      */
```

One of the requirements of the DLL is that symbols contained within the DLL must be exported to other modules when requested by them. The compiler encodes the fact that a symbol is exported in the corresponding defining name record in the object module. In MVS, this is achieved by specifying the EXPORTALL compile option. This option instructs the compiler to export all external defined functions and variables within the DLL to the module using the DLL. Using the EXPORTALL compile option makes all the external variables and functions within the DLL available to all modules which use the DLL, not only the first module to call the DLL.

Alternatively, in MVS, the #pragma directive can be used to export only specific external variables and functions from the DLL. This is illustrated by the following example of source code:

```
#pragma export(math_func1)
#pragma export(math_func2)
int math_func1() {
    :
    :
}
int math_func2() {
    :
    :
}
int kpItHdn() {
    :
    :
} pragma export(math_var1)
pragma export(math_var2)
int math_var1;
int math_var2;
int kpItHdnVar;
```

In the above example, the functions "math_func1()" and "math_func2()" and the variables "math_var1" and "math_var2" are exported and thereby made available to all modules that use the DLL. The function "kpItHdn()" and the variable "KpItHdn Var" are not exported and are not directly available to the user modules.

The prelinker's input consists of many object decks generated by a compiler. The prelinker's output consist of a prelinked object deck.

The prelinker maps out data items in the data area by assigning them offsets within that area and by fixing up references to them in the output prelinked object module with those offsets.

The prelinker also gathers together initialization information generated by the compiler about items in the data area for use by the RTL.

All address fixups for symbols in the code area are simply passed on to the system linker/loader to manage.

The prelinker generates information which defines the initialization of all variable and function descriptors in the data area. Variable descriptors are initialized in a way to indicate that the address of the variable is not yet known. Function descriptors for imported functions are initialized to contain the address of a RTL routine which triggers the load of the DLL, whereas function descriptors for non-imported functions are initialized to contain the address of the function within the same load module.

If a variable is not imported, the prelinker fixes up references to it by the variables offset in the data area. If a variable is imported, the prelinker fixes up references to it with the offset of its descriptor in the program's data area and indicates that this is a descriptor (high bit on).

During the prelink a list of all exported functions and a list of all exported variables is collected. Object code which defines these lists is created by the prelinker and emitted in the output prelinked object deck as an export definition section. These lists are ultimately placed in the code area of the load module associated with the program. The RTL will read these lists in the code area to obtain the names of functions and variables exported by this program and their addresses.

The information about where to import symbols from must be provided to the prelinker at prelink time. However, the format need not be in a side-file. In the example shown in FIG. 1, this is achieved through the use of the side-files MATH.objdef 135 and TRIG.objdef 155. In the illustrated example, a DLL definition side-file (a directive file) is provided by the DLL provider and is used when the application is prelinked. The side-file contains IMPORT directives which describe all the functions and variables in the DLL that may be imported by an application.

FIG. 1 illustrates an embodiment of a method in which two DLL modules and a related application module are built in accordance with the teachings of the invention; Specifically, the source code file APP.c 110 is compiled as are the other files 115, 120. However, when the object deck App.obj 165 is prelinked 190, the side-files MATH.objdef 135 and TRIG.objdef 155 provide additional information as to from where the import symbols are to be acquired.

This DLL definition side-file contains directives that tell the prelinker how to resolve references to functions and variables defined in the DLL. Multiple DLL definition side-files can be provided, if multiple DLLs are being referenced.

While we have described the use of a side-file to enable the application to have access to the DLLs, there are other ways in which this could be achieved as would be readily apparent to those skilled in this art. For example, the prelinker could read the information from the code area of the DLL directly 140, 160.

The object file generated by the compile operation 196 of the application source file 110, shown as APP.obj 165 in FIG. 1, must be able to access the DLL definition side-file supplied by the DLL 135, 155. To achieve this, the DLL provider supplies the DLL definition side-file 135, 155 with the set of object decks to link at prelink time.

For each function or variable that was exported from the DLL (indicated in the object decks generated by the compiler) the prelinker generates an "IMPORT" prelinker directive:

IMPORT CODE <dll_name><identifier>or

IMPORT DATA <dll_name><identifier>

This IMPORT side-file is generated during DLL prelink 180, 185. It is used in the prelink 190 of another program 175 which imports symbols from the DLL. For the importing program 175 this directive provides the name of the load module which exports the symbol.

The definition side-file is created automatically during prelink of the DLL in addition to the usual object deck for the DLL code itself. For instance, for the DLL in the above source files, the prelinker would generate the following DLL definition side-file:

IMPORT CODE MATH math_func1

IMPORT CODE MATH math_func2

IMPORT DATA MATH math_var1

IMPORT DATA MATH math_var2

The DLL provider can edit the DLL definition side-file to control what functions and variables are imported. For instance, in the above example, if the DLL provider did not want to expose "math_func2()", the provider would remove the record "IMPORT CODE MATH math_func2" from the definition side-file.

During prelink of the application, the prelinker collects a list of all imported functions and variables and the corresponding load module from which they are imported. The prelinker emits object code which defines these lists. Each list contains information describing a function or variable, a symbol name, an offset of a descriptor 225 in the application's data area 210 and the name of the DLL from which the symbol is imported. This list will be used by the RTL after a DLL is loaded to locate descriptors needing address fixups.

To implement the invention, each DLL must be created to have certain defined characteristics. In the following embodiment of the present invention, we will describe these characteristics in the form required for the MVS operating system, however, the implementation of the invention on other operating systems will be obvious to those skilled in this art.

At load-time, the code and data areas of a program are created. The RTL uses the system loader to load an application and resolve addresses of statically bound symbols in the code area. When an application is loaded, the RTL locates and reads the information collected and generated, by the prelinker 190, in the code area 205, 205' to allocate and initialize the data area 210, 210' for that program.

The base address of this initialized data area is passed as a parameter to the application. The compiler generated code uses this base to calculate addresses of objects in the data area of the application.

Once loaded the RTL has the responsibility of fixing up addresses in descriptors 215 to provide dynamic linking. The RTL finds the exported symbols names and addresses through information generated by the prelinker which resides in the data area of the DLL which was loaded.

For an implicit load-time DLL the DLL is loaded and any corresponding descriptors are fixed up by the RTL before any of the users code is executed. This happens in the "C" language for an initializer at file scope such as:

int * ip =&I; /* store address of symbol 'I' in 'ip'*/ where 'I' is imported. 'ip' must contain the address of 'I' before any of the users code is executed. This means that the DLL defining 'I' must be an implicit load-time DLL.

An implicit load-on-use DLL is one which is loaded during execution of user code. A hidden RTL service is triggered by a function call. The RTL service load the DLL indicated in the descriptor and fixes up any necessary descriptors before returning control to the users code.

Load-on-use DLLs (the most demanding) require four things not offered by the standard linker/loader:

1. Automatic/implicit load of DLL module when required.

2. Connection of variable/function references in the application to corresponding definitions in the DLL when the DLL is loaded.

3. Swap of the data areas across a call between separate modules (application to DLL or DLL to DLL).

4. Fast implementation of the above with minimal intervention from either application writer or DLL provider in either source or module preparation (compile, prelink, link).

The basic implicit load-on-use scheme described here provides these necessary things. There are three key elements to the scheme:

1. Variable and function descriptors (for a given application)

There is one such descriptor for each external variable/function that is referenced from the given application and is defined in some DLL, or the application. Each descriptor is a control information block in the data area of the application and it describes two things about the given variable or function:

a. how to load the DLL that owns the specific variable/function, if the variable/function is not defined in the application.

b. what the address is of the specific variable or function in application or DLL storage.

In the case of a function, the descriptor additionally records:

c. the address of the data area for the DLL (once the DLL has been loaded)

2. Compiler generated DLL code sequences for referencing imported variables

The compiler emits a DLL code sequence for referencing an imported variable. This sequence first ensures that the DLL is loaded, (if the variable is in a DLL and not the application), and triggers the load of the DLL if it is not loaded. It then accesses the desired variable indirectly via the corresponding variable descriptor in the application's data area.

3. Calling imported functions.

The compiler is unaware if a function is defined in another compilation unit, but still within the application or is truly imported from a DLL and generates the same code for both.

The function called is the one indicated inside the function descriptor. For any imported function the function descriptor initially indicates a RTL trigger function. When called the trigger function loads the DLL (both code and data areas) and in the caller's function descriptor it fixes up the functions address and the address of the data area so that on subsequent calls the originally intended function is called directly.

After the trigger function loads the DLL and modifies the function descriptor it calls the originally intended function.

A key characteristic of these implicit load-time and load-on-use DLLs is that their use is essentially transparent to the application code. The application simply codes a call to a DLL function by name or an explicit reference to a DLL variable by name. The DLL implications are largely hidden from the source-level view of the application source code.

The actual connection between the reference and a definition exported from the DLL is made when the DLL is loaded. The DLL may be loaded either before any user code is executed or during execution of user code at runtime.

Our invention is described in relation to load-time, known as the implicit load-on-use command or runtime DLL on the MVS operating system available from International Business Machines Corporation. For ease of description, the unqualified term "DLL" will generally mean the implicit load-time or load-on-use DLL. The explicit runtime DLL implementation is largely an extension of the implicit load-time implementation. Where the discussion applies specifically to implicit load-on-use or explicit runtime DLLs, it will be made clear by explicitly qualifying the reference appropriately or by context.

One key characteristic of explicit runtime DLLs is that their use is explicitly controlled by the application code at the source level. The connection between the application and the DLL function is made via explicit source-level calls to one or more execution-time services.

For explicit runtime DLLs, the lists of imported and exported symbols generated by the prelinker are used by the RTL to find the requested function or variable and to construct the necessary function address or variable address to be returned to the querying application.

For implicit load-time and load-on-use DLLs, these exported symbol lists are used by the RTL at DLL load to initialize the imported variable or function descriptors in the importing application's data area.

The runtime implementation is added as a relatively small, well-integrated extension to this base implicit load-on-use scheme.

We now describe the explicit runtime DLL services.

An example of the use of the invention with explicit runtime services will be described. To use an explicit runtime DLL, the writer of the source code explicitly calls the execution-time services. Except for these calls to the execution-time services, there is no implicit or automatic connection between the application module requiring a link to a DLL module and the DLL to be linked to the application module. For example, the application writer could include the following calls in the source code:

---
dllload(): OBTAIN A HANDLE FOR A DLL
include <dll.h>
dllhandle* dllload(char *dllName);
---

This function loads the DLL into memory at explicit application request if it hasn't previously been loaded and connects it to the application by returning a handle for it to the program that has invoked it. This handle uniquely identifies the requested DLL on subsequent runtime-DLL requests.

---
dllqueryfn(): OBTAIN AN ADDRESS OF A DLL FUNCTION
include <dll.h>
void (*dllqueryfn(dllhandle * dh, char * funcName)) ();
---

This function accepts a DLL handle which was returned from a previous dllload() request and the name of an exported function in that DLL. The function returns an address of an executable stub that invokes the requested DLL function. This stub may or may not be part of the actual requested function or DLL and no assumptions is made either way. The returned address is only guaranteed to be executable and to ultimately invoke the requested function. If the call to dllqueryfn() fails, a NULL address is returned.

---
dllqueryvar(): OBTAIN AN ADDRESS OF A DLL VARIABLE
include <dll.h>
void* dllqueryvar(dllhandle * dh, char *varName);
---

This function accepts a DLL handle which was returned from a previous dllload() request and the identifier of a particular exported variable of that DLL. It returns an address of the requested variable in the specified DLL's storage. If the call to dllqueryvar() fails, a NULL address is returned.

The application writer does not need to include the DLL definition side-file during application preparation (i.e. compile or prelink, respectively). However, the application writer must have knowledge of the names of the desired exported variables and functions in the DLL. This can be obtained via headers or other means (e.g. product documentation) as determined by the particular DLL-provider.

The application can access a dllqueryvar()'ed variable by indirection on the returned variable address. it can call a dllqueryfn()'ed function by invoking the returned function address.

---
dllfree(): RELEASE A HANDLE FOR A DLL
include <dll.h>
int dllfree(dllhandle * dh);
---

This function frees the supplied DLL handle and deletes the DLL from memory if appropriate (ie: if this was the last handle accessing the DLL). Behaviour is undefined if a dllqueryvar()'ed variable or a dllqueryfn()'ed function is referenced after the handle used by the application has been freed by dllfree().

The differences for the case of runtime access to the DLL is entirely limited to the using application. The application's implicit references to imported functions and variables are replaced by explicit calls to RTL services dllload(), dllqueryfn() (or dllqueryvar()) followed by references to the imported functions and variables indirectly through the addresses returned from dllqueryvar() or dllqueryfn() calls. The DLL provider, on the other hand, prepares the DLL in exactly the same fashion as shown here for the load-time.

DLLs are shared at the enclave level. An enclave is an independent collection of routines. One of the routines is designated as the main. An enclave is roughly analogous to a program. These routines may be in an application and some in the DLLs which it loads.

A referenced DLL is loaded exactly once per enclave and exactly one copy of exported variables is created/maintained per DLL per enclave. Thus a single copy of a DLL serves all using modules in a given enclave. This applies equally to load-time and runtime accessed DLLs within a given enclave. In particular, it is acceptable to simultaneously access a given DLL within a given enclave as both a runtime and a load-time DLL (including via multiple runtime handles if desired). All accesses to a given variable in a given DLL in a given enclave reference the one and only copy of that variable. All accesses to a given function in a given DLL in a given enclave, reference the one and only copy of that function.

Although only one copy of a DLL is maintained per enclave, the number of logical loads is counted. For a given DLL in a given enclave, one logical load is counted if the DLL is designated implicit load-on-use and any reference is made to it, and one logical load is counted for every dllload() issued against it.

The actual deletion of the DLL, (including its variables) takes place when its logical load count reaches zero.

A DLL is logically freed by either an explicit runtime dllfree() request or an implicit free that occurs for a loaded load-time DLL at enclave termination. Dllfree()s are optional for explicit runtime DLLs. Any DLLs (load-time or runtime) that remain at enclave termination (i.e. have non-zero use count either because they were load-time accessed or because they were runtime accessed but sufficient dllfree ()'s were not issued) are automatically deleted (including its variables). This implicit free at termination is the only way that a load-time DLL can be freed. An explicit runtime DLL, however, can be freed prior to termination by an explicit dllfree(). It is not possible to free (intentionally or inadvertently) the load-time copy of a DLL by issuing a runtime dllfree() request in any fashion.

The RTL maintains a list of loaded DLLs so that it can load them if need be and free them either on explicit call or upon application clean up.

Upon termination of the application the RTL deletes any remaining DLLs.

We now show an example of building two exporting DLLs and an importing application.

In FIG. 1, an application source file APP.c 110 references functions and variables from two DLLs, shown as source files MATH.c 115 and TRIG.c 120.

The source file MATH.c 115 is compiled 195 to generate an object deck MATH.obj 125. To implement the invention, the object deck MATH.obj 125 is prelinked by a prelinker 180.

Prelinking 180 of the object deck MATH.obj 125 creates an object deck MATH.pobj 130 and a DLL definition side-file MATH.objdef 135. MATH.pobj 130 is linked 182 by the system linker to form an executable load module MATH.load 140.

The source file, TRIG.c 120, is similarly compiled 197 to create an object deck TRIG.obj 145 and prelinked to provide an object deck, TRIG.pobj 150, and a DLL definition side-file TRIG.objdef 155. TRIG.pobj is also linked by the system linker 184 to form an executable load module, TRIG.load 160.

The source file, APP.c 110, is similarly compiled 196 to create an object deck APP.obj 165 and prelinked 190 to provide an object deck, APP.pobj 170, but no DLL definition side-file is produced as no symbols are exported by the application. The two DLL definition side-files for the DLLs MATH 135 and TRIG 155 are included in the prelink of APP 190 to provide information on where to import symbols from. App.pobj 170 is then linked by the system linker 183 to form an executable load module, App.load 175.

In the described example, each DLL is shown as being composed of a single compilation unit. However, DLLs may be composed of multiple compilation units. In that situation each compilation unit would be separately compiled. However, only a single prelink would be required for each DLL. Also, in the example shown in FIG. 1, the application APP is not itself a DLL and the MATH and TRIG modules do not use other DLLs.

To enable an application to use a DLL, the application writer must provide it with the appropriate instructions to access the DLL. Again here we will illustrate the invention when applied to the MVS operating system but it will be readily apparent to the skilled person how the invention may be implemented in other systems which permit linking of a plurality of source files.

Figure 2:
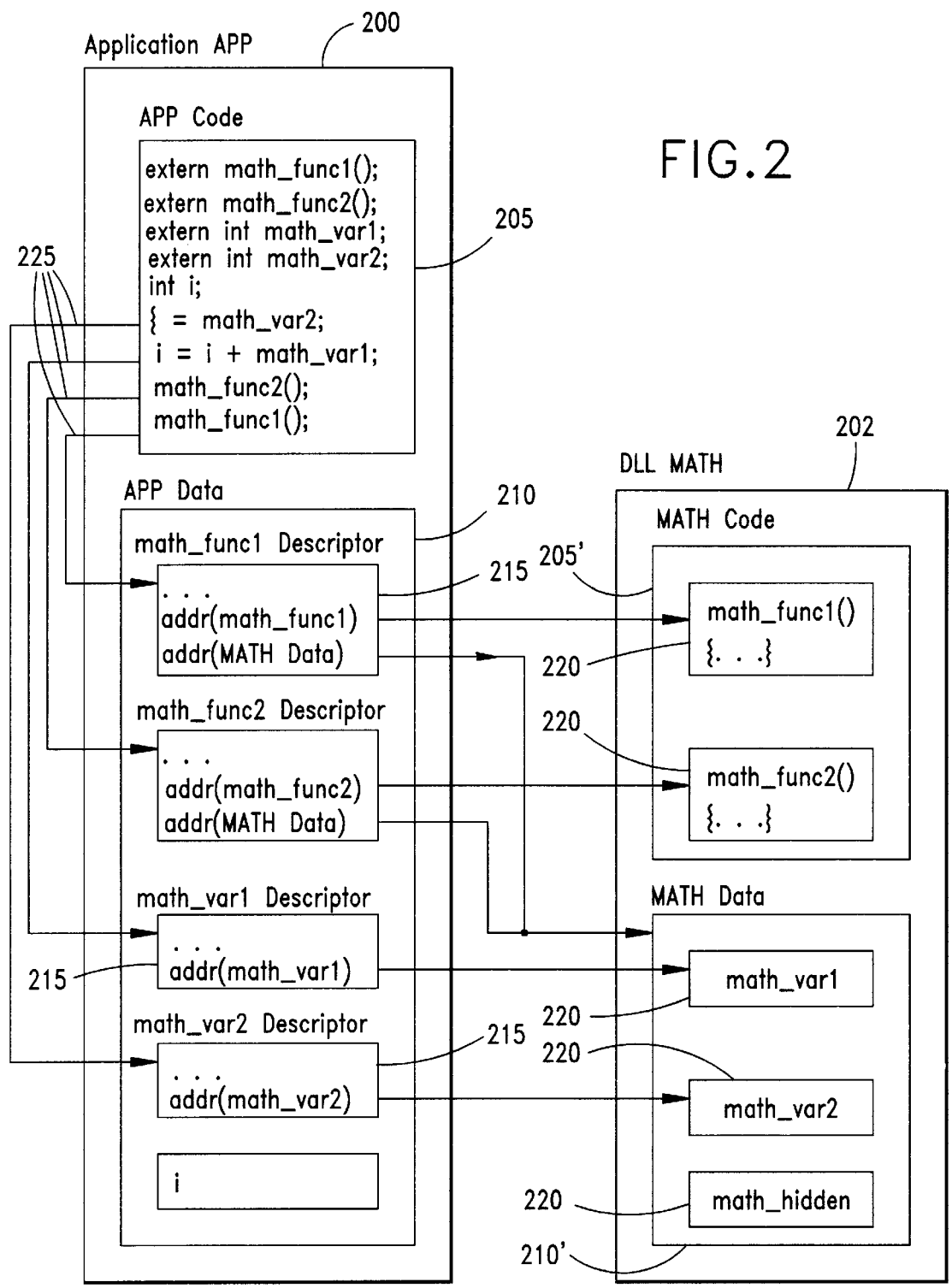
FIG. 2 shows a block diagram and flowchart illustrating a relationship between an importer and an exporter of functions and variables when using the present invention.

FIG. 2 shows the connection between the application APP 200 and the DLL MATH 202. As seen in FIG. 2, application APP has a modifiable data area 210 and a code area 205 which the system loader has loaded. The code area includes executable instructions which may be write protected to ensure that address information 225 in the code area 205 cannot be changed. The DLL MATH has similar code 205 and data areas 210. With the present invention, the RTL will modify values in the application's data area 210 during runtime of the program and not just during load time as was done in the prior art systems. Unlike prior art systems, symbols may be dynamically linked without modification of the code area 205.

Descriptors 215 for imported symbols 220 have addresses inside of them which are fixed up by the RTL after DLL MATH 202 is loaded but during execution of APP 200. Each program which imports symbols 220 from MATH 202 has its own descriptors 215 in its own data area 210. If two programs import the same symbol from MATH they each have their own descriptor, but the address in the descriptor to the symbol in MATH will be the same. Thus, all users can advantageously share the same code area of a DLL, and the program is reentrant.

It will be obvious to one skilled in the art that the invention supports DLLs that use other DLLs.

Now that the invention has been described by way of a preferred embodiment, with options, various modifications and improvements will occur to those skilled in the art. Thus it should be understood that the detailed description has been provided as an example and not as a limitation. The scope of the invention is defined by the appended claims.

Having thus described our invention, what we claim as new and desire to secure by Letters Patent is:

1. An improved method for linking a dynamically linked library (DLL) to a program executing on a data processing system having a compiler, a prelinker, a runtime library, a system linker and a system loader, said method comprising the steps of:

said compiler compiling an application program code with the DLL to create a DLL object deck and an application object deck which includes code for calling a trigger routine and encoding the DLL object deck with information identifying an exported symbol referenced in the application program code;

said prelinker prelinking the DLL object deck to create a prelinked DLL object deck, responsive to said encoding step;

said prelinker prelinking the application object deck with the information identifying the exported symbol, said prelinker creating a prelinked application object deck which includes an export definition section;

said system linker linking said prelinked application object deck to create an application load module and linking said DLL prelinked object deck to create a DLL load module; and running the application load module and resolving references to unresolved symbols in the application load module without requiring assistance from said system linker or said system loader.

2. A method as claimed in claim 1, wherein said step of resolving references to unresolved symbols in the application load module without requiring assistance from said system linker or said system loader comprises the steps of:

the trigger routine accessing said export definition section;

said runtime library accessing the DLL containing said unresolved symbols, responsive to said step of the trigger routine accessing said export definition section; and loading the DLL and resolving said unresolved symbols in the application load module, responsive to said runtime library accessing step.

3. A method as claimed in claim 1, wherein said step of prelinking the application object deck further comprises the step of:

reading the information identifying the exported symbol and generating a definition file for the DLL, said definition file including the information identifying the exported symbol reference.

4. A method as claimed in claim 3 wherein said definition file further specifies whether the exported symbol is code or data and the dynamic link library defining the symbol.

5. A method as claimed in claim 3, wherein said step of prelinking the application object deck further comprises the step of maintaining the definition file current with any changes in said dynamic link library.

6. A method as claimed in claim 3 wherein said export definition section includes information from said definition file.

7. A method as claimed in claim 1, wherein said step of prelinking the application object deck further comprises the step of reading the information identifying the exported symbol directly from the DLL.

8. A method as claimed in claim 1 wherein exported symbols comprise external variables and external functions.

9. A method as claimed in claim 1, wherein said trigger routine is one of a trigger load on reference for variables and a trigger load on call for functions.

10. A method as claimed in claim 1, wherein said step of resolving references to unresolved symbols, further comprises the step of:

the run time library modifying an address of the unresolved symbols in a data area of the DLL during runtime so that the program is reentrant.

* * * * *